(12) United States Patent
Ramsey

(10) Patent No.: US 7,784,760 B2
(45) Date of Patent: Aug. 31, 2010

(54) MOTORCYCLE TURNTABLE

(76) Inventor: Jerry Ramsey, 11838 Old Ranch Rd., Victorville, CA (US) 92392

( * ) Notice: Subject to any disclaimer, the term of this patent is extended or adjusted under 35 U.S.C. 154(b) by 1232 days.

(21) Appl. No.: 11/357,591

(22) Filed: Feb. 17, 2006

(65) Prior Publication Data

US 2007/0196202 A1 Aug. 23, 2007

(51) Int. Cl.
*A47G 29/00* (2006.01)
(52) U.S. Cl. ...................... 248/349.1; 104/44
(58) Field of Classification Search ................ 414/426, 414/401, 537; 104/42, 206, 44; 248/349.1
See application file for complete search history.

(56) References Cited

U.S. PATENT DOCUMENTS

| | | | |
|---|---|---|---|
| 4,077,607 A * | 3/1978 | Lovelady | 254/88 |
| 4,676,171 A * | 6/1987 | Kelderman | 104/45 |
| 5,239,854 A * | 8/1993 | Hinson | 72/457 |
| 5,486,014 A * | 1/1996 | Hough | 280/79.11 |
| 5,609,461 A | 3/1997 | Lichtenberg | |
| 5,984,253 A | 11/1999 | Bilyk | |
| 6,467,746 B1 | 10/2002 | Paskiewicz | |
| 6,749,168 B2 | 6/2004 | Johnson | |
| 7,357,451 B2 * | 4/2008 | Bendure et al. | 297/256.12 |
| 7,473,061 B1 * | 1/2009 | Santangelo | 410/1 |
| 2003/0061959 A1 * | 4/2003 | Johnson | 104/44 |
| 2003/0101894 A1 * | 6/2003 | Schwenker | 104/35 |
| 2003/0215313 A1 | 11/2003 | Hinkle | |

* cited by examiner

*Primary Examiner*—Charles A Fox
(74) *Attorney, Agent, or Firm*—Bruce A. Jagger; Lance M. Pritikin

(57) ABSTRACT

A motorcycle turntable includes an elongated ramp assembly pivotally supported for slidable rotation about an approximate mid-point. The elongated ramp assembly includes an outer low friction skid plate attached to its reverse side generally adjacent each of its opposed outer ends. The weight of a conventional motorcycle is sufficient to cause the elongated ramp assembly to flex so that its ends bend downwardly towards the floor. As the elongated ramp assembly with its drooping ends is rotated about its midpoint on a pedestal-bearing assembly, the low friction skid plates skid across the floor. Most of the weight is born by the pedestal-bearing assembly, which includes at least one low friction plate. The thickness of the skid plates and the flexibility of the structure are such as to allow the ends to droop into light contact with the floor. This permits slidable rotation to be accomplished. Additional low friction pads of a suitable thickness may be provided between the outer ends of the elongated ramp assembly and the mid-point about which it rotates.

8 Claims, 9 Drawing Sheets

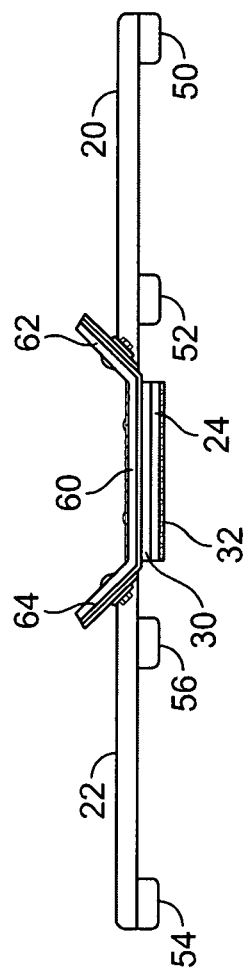
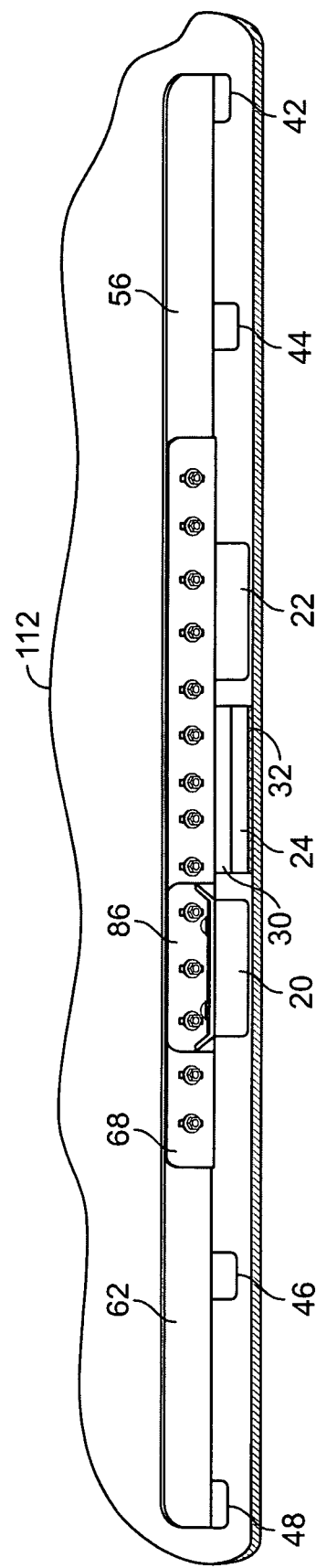

MOTORCYCLE TURNTABLE

BACKGROUND OF THE INVENTION

1. Field of the Invention

The invention relates in general to methods and devices for motorcycle turntables, and, more particularly, embodiments of the present invention relate to motorcycle turntables mounted for sliding rotation on low friction skid plates.

2. Description of the Prior Art

Motorcycles are awkward to handle when they are not under power, particularly when it is necessary to back them up. Most motorcycles have no reverse gear. When it is necessary to back one up, the operator must typically manhandle the machine while supporting it to keep it from tipping over. It had been proposed to provide turntables so that a motorcycle may be driven forward onto the turntable, the turntable rotated 180 degrees (or any other desired angle), and the motorcycle driven forward off the turntable. This, for example, allows a motorcycle to be driven into and out of a garage.

Numerous prior art devices and methods for motorcycle turntables had been proposed, but they are problematic for a number of reasons. A major shortcoming of typical prior art devices and methods is their complexity, mass, and expense.

Typical prior expedients include, for example, Johnson US 2003/0061959, Pub. Apr. 3, 2003 (a rigid ramp tiltably mounted to a non-rotating pedestal wherein a motorcycle is intended to be bolted to the ramp); Hinkle US 2003/0215313, Pub. Nov. 20, 2003 (a rigid carousel device with laterally extending wings, and rotatably mounted on rollers for pivoting about a center point); Johnson U.S. Pat. No. 6,749,168, issued Jun. 15, 2004 (a pedestal for rotatably mounting a motorcycle bolted thereto); Kelderman U.S. Pat. No. 4,676,171, issued Jun. 30, 1987 (a turntable mounted on rollers for rotation about a center point); Lichtenberg U.S. Pat. No. 5,609,461, issued Mar. 11, 1997 (a dolly wherein a rigid chassis is mounted on swiveling casters, and a kickstand support platform is mounted at an adjustable location on the chassis); Drabing U.S. Pat. No. 4,901,647, issued Feb. 20, 1990 (a rigid carousel device with laterally extending wings, and rotatably mounted on casters for pivoting about a center point); Bilyk U.S. Pat. No. 5,984,253, issued Nov. 16, 1999 (a very rigid elongated trough rotatably mounted about a center bearing wherein the entire device tips to allow a motorcycle to drive into the trough, and rotatability depends on the weight of the motorcycle be balanced on either side of the center bearing so both ends of the trough clear the ground); Paskiewicz U.S. Pat. No. 6,467,746, issued Oct. 22, 2002 (a relatively heavy and complex multi-function turntable-dolly that purports to provide rotatability, lateral movement, and foldability, and including laterally extending kickstand support members). Constructing rigid turntables requires the use of considerable amounts of heavy material, usually steel. Fabricating costs for such heavy materials are generally significant. Because of the mass involved shipping and handling costs are substantial. Casters and rollers add significantly to the cost, require some maintenance, and are prone to failure. Complicated structures generally require that close tolerances be maintained. This adds to the cost of production. Casters sometimes swivel to an angle where they are hard to start to move in a desired direction when heavily loaded.

Those concerned with the problems in the motorcycle turntable art recognized the need for an improved motorcycle turntable.

BRIEF SUMMARY OF THE INVENTION

The present invention has been developed in response to the current state of the art, and in particular, in response to these and other problems and needs that have not been fully or completely solved by currently available expedients. Thus, it is an overall object of the present invention to effectively resolve at least the problems and shortcomings identified herein. In particular, it is an object of the present invention to provide an economical, simple, adjustable motorcycle turntable that can be easily disassembled for storage and transportation, and that is suitable for use by an individual. It is also an object of the present invention to provide such a turntable that does not require casters or rollers, but rather relies on low friction skid plates. Finally, it is an object of the present invention to provide such a turntable with a relatively flexible ramp that allows the skid plates to rest lightly on the ground when the turntable assembly is loaded. Embodiments of the present invention are particularly suitable for use by individuals in connection with home storage and unassisted handling of motorcycles.

A preferred embodiment of the motorcycle turntable assembly according to the present invention comprises an elongated ramp assembly which is pivotally supported on a pivot bearing assembly for slidable rotation about an approximate mid-point.

The elongated ramp assembly includes opposed outer ends, an obverse side, a reverse side, and outer low friction skid plates replaceably attached to said reverse side generally adjacent each of said opposed outer ends. The elongated ramp assembly preferably comprises two ramp panel elements that are releasable mounted reverse side down in a ramp tray member. The ramp panel elements typically extend axially outwardly beyond the respective ends of the ramp tray member.

A pedestal mounted pivot bearing assembly supports the elongated ramp assembly for rotation about the approximate mid-point. The pedestal-bearing assembly supports the midpoint a distance above a supporting substrate such as a floor. This support is such that the mid-point of the elongated ramp assembly is spaced from the substrate by a mid-distance.

The construction of the elongated ramp assembly is such that when loaded by the presence of a conventional motorcycle, the ends of the elongated ramp assembly are deflected or droop towards the substrate. The total angle of deflection (measured between the substrate and the outer end of the elongated ramp assembly) is typically approximately 1 to 2 degrees. The outer low friction skid plates are thinner than the mid-distance so as to allow a significant part (preferably at least half, and more preferably two thirds or more) of the load to be born by the pedestal bearing assembly before the flexing of the elongate ramp assembly deflects the skid plates down to touch the substrate. The elongated ramp assembly should be stiff enough that the amount of the load born by the skid plates does not prevent their sliding over the substrate as the elongated ramp assembly is rotated about the mid-point. Preferably, the weight of the motorcycle is approximately balanced around the mid-point so that each arm of the ramp assembly is deflected by approximately the same amount, and the load is distributed approximately equally between the two skid plates. Allowing the outer ends of the ramp assembly to droop permits the use of relatively light materials in the construction of the ramp assembly. This reduces the cost of materials and production, the cost of shipping, the difficulty in handling and assembling the turntable, and reduces the amount of effort that is required to perform the desired rotation of the turntable in use.

Additional replaceable low friction skid plates may be employed, particularly with heavier motorcycles (approximately 1,200 pounds and up). When employed, such additional skid plates are typically positioned on the reverse side of the elongated ramp assembly between the outer low friction skid plates and the mid-point of the elongated ramp assembly. In general, the location of such medial skid plates determines their thickness. The thickness is adjusted so that flexure of the elongated ramp assembly causes these medial plates to contact the supporting substrate at approximately the same degree of deflection as the other skid plates. Because they are positioned axially inward toward the mid-point from the outer skid plates, these medial skid plates are typically thicker than the outer skid plates by a factor of approximately one and a quarter to three times, more or less. Thus, the load on the elongated ramp assembly is distributed between the pedestal-pivot bearing assembly and all of the skid plates. This reduces the load on each individual skid plate and permits the loaded elongated ramp assembly to slidably rotate under the force that a typical individual motorcycle rider is easily capable of exerting. Preferably, as much as half or more of the total load is born by the pedestal-bearing assembly, which includes one or more low friction swivel plates. The elongated ramp assembly rests on the swivel plate(s) at approximately the mid-point of the ramp assembly. In some embodiments it is preferable that approximately 80 percent or more of the weight be on the centrally located swivel plate. This allows the skid plates to act primarily as stabilizers. This permits the elongated ramp assembly to slide easily as rotation is accomplished. If the weight of a particular motorcycle is such that difficulty is experienced in accomplishing the desired rotation, adding medial low friction skid plates of the proper thickness will distribute the load so that rotation may be accomplished with greater ease.

Motorcycles typically are supported when stationary by kick stands. Usually, these kick stands project out laterally from the motorcycle somewhere near the machine's center of gravity, and rest on the ground with the machine leaning on them. Kick stands must be supported off of the substrate surface to permit the motorcycle turntable to rotate around the mid-point. The placement of kick stands is not uniform to all motorcycles, so variations between machines must be accommodated. Preferably, kick stands are supported on a kick stand platform assembly that projects laterally outwardly from the elongated ramp assembly in about the same place as the ramp assembly itself. A motorcycle with the kickstand extended should be supported on the ramp-kick stand assembly in about the same attitude as it would normally exhibit resting on a floor or other substrate. The platform assembly should be adjustably mounted for location along the length of the elongated ramp assembly. The kick stand platform assembly should be provided with one or more stand low friction skid plates to facilitate the rotational sliding of this platform over the supporting substrate. The stand low friction skid plates should be of such a thickness that they rest on the ground when loaded without much flexure of the edges of the elongated ramp assembly. Some small vertical adjustment of the kick stand platform assembly may be provided to permit the proper vertical locationing of the platform to minimize undesired flexure of the edges of the ramp assembly. If desired, a kick stand platform assembly may be adjustably mounted on opposed edges of the ramp assembly, or more than one such platform may be adjustably located on the same side of the ramp assembly. This permits the same or different motorcycles to be accommodated without the necessity of reorienting or re-adjusting the ramp assembly. This second kick stand platform projecting opposedly to the first such platform also adds stability to the turntable.

A pedestal member is provided to support the approximate mid-point of the elongated ramp assembly up away form the supporting substrate. Typically, the pedestal includes some kind of a non-slip surface to engage the supporting substrate. This tends to keep the motorcycle turntable in the desired location as force is applied to accomplish the desired rotation.

A bearing assembly is provided between the mid-point and the pedestal member to facilitate the desired rotation. The bearing assembly typically includes, for example, a stub shaft mounted in a sleeve. One element of the bearing assembly is mounted to the pedestal assembly and the other bearing element is mounted to and rotates with the elongated ramp assembly. The bearing element that is mounted to the pedestal assembly, and the pedestal assembly itself, do not rotate. The swivel plate(s) may or may not rotate with the elongated ramp assembly. More complicated bearing assemblies may be used if desired, but are generally not necessary. Preferably, the bearing assembly serves to keep the elongated ramp assembly properly centered over the pedestal with the swivel plate(s) in the desired location, and does not carry any significant vertical load. The combined thickness of the pedestal assembly and the bearing assembly generally determines the distance by which the elongated ramp assembly is spaced from the floor or other supporting substrate. This mid-point distance is generally greater than the thickness of the medial or outer low friction skid plates, sometimes by as much as approximately one and a quarter to three times, more or less.

The low friction skid plates and the swivel plate(s) are preferably composed of polymerized plastic materials such as polyethylene, polyproplyene, nylon, polyvinyl chloride, or the like. Unlike metals, these materials do not tend to permanently mark or wear the substrate, and they exhibit lower frictional resistance to sliding over supporting substrates than is exhibited by comparable metal plates. Such low friction plastic materials are widely used as wear plates in various mechanical applications. These materials are self lubricating, and they tend to last longer under certain circumstances than metal wear plates. It is contemplated that such conventional known and yet to be developed or discovered low friction plastic materials can be used in practicing the present invention. They are replaceably mounted (typically but not necessarily by through bolts) so that they can be replaced when worn beyond continued usefulness.

To acquaint persons skilled in the pertinent arts most closely related to the present invention, a preferred embodiment of a motorcycle turntable that illustrates a best mode now contemplated for putting the invention into practice is described herein by, and with reference to, the annexed drawings that form a part of the specification. The exemplary motorcycle turntable is described in detail without attempting to show all of the various forms and modifications in which the invention might be embodied. As such, the embodiments shown and described herein are illustrative, and as will become apparent to those skilled in the arts, can be modified in numerous ways within the scope and spirit of the invention, the invention being measured by the appended claims and not by the details of the specification or drawings.

Other objects, advantages, and novel features of the present invention will become more fully apparent from the following detailed description of the invention when considered in conjunction with the accompanying drawings, or may be learned by the practice of the invention as set forth herein.

BRIEF DESCRIPTION OF THE DRAWINGS

The present invention provides its benefits across a broad spectrum of motorcycle turntables. While the description which follows hereinafter is meant to be representative of a number of such applications, it is not exhaustive. As those skilled in the art will recognize, the basic apparatus taught herein can be readily adapted to many uses. This specification and the claims appended hereto should be accorded a breadth in keeping with the scope and spirit of the invention being disclosed despite what might appear to be limiting language imposed by the requirements of referring to the specific examples disclosed.

Referring particularly to the drawings for the purposes of illustrating the invention and its presently understood best mode only and not limitation:

FIG. 4 is front view of the embodiment of FIG. 1.

FIG. 5 is a side view of the embodiment of FIG. 1.

DETAILED DESCRIPTION OF THE PREFERRED EMBODIMENTS

Figure 1:
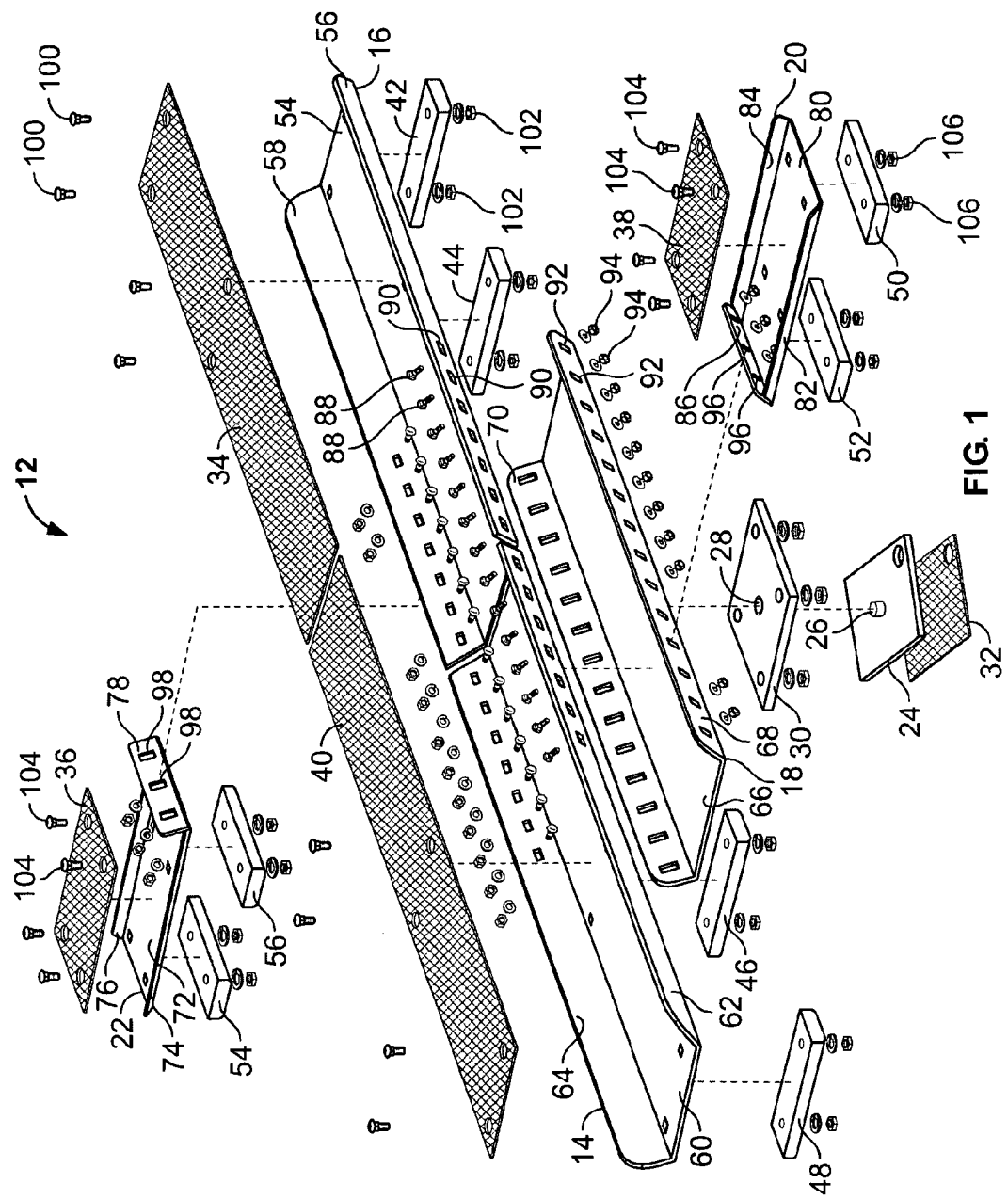
FIG. 1 is an exploded perspective view of a preferred embodiment of a motorcycle turntable according to the present invention.

Referring now to the drawings wherein like reference numerals designate identical or corresponding parts throughout the several views. It is to be understood that the drawings are diagrammatic and schematic representations of various embodiments of the invention, and are not to be construed as limiting the invention in any way. The use of words and phrases herein with reference to specific embodiments is not intended to limit the meanings of such words and phrases to those specific embodiments. Words and phrases herein are intended to have their ordinary meanings, unless a specific definition is set forth at length herein.

Referring particularly to the drawings, there is illustrated generally at 10, a motorcycle, and at 12 a motorcycle turntable upon which motorcycle 10 is mounted. In the embodiment chosen for illustration, motorcycle turntable 12 includes an elongated ramp assembly, a pivot bearing assembly, a pedestal, and a pair of kick stand platforms disposed on opposed edges of the elongated ramp assembly.

In the embodiment chosen for illustration, the elongated ramp assembly includes first and second ramp panel elements 14 and 16, respectively. The proximal ends of these ramp panel elements are butted together to form the elongated structure upon which motorcycle 10 rests as it is rotated.

Ramp panel element 14 includes obverse side 60, and upturned ramp edges 62 and 64. Ramp edges 62 and 64 serve to define therebetween a trough for receiving and guiding the wheels of a motorcycle on the obverse side 60 of ramp panel element 14. An outer low friction skid plate 48 is replaceably mounted, for example, by through bolts to the reverse side of ramp panel element 14 adjacent the distal end of ramp panel element 14. Medial low friction skid plate 46 is likewise replaceably mounted to the obverse side of ramp panel 14 at a location intermediate the proximal and distal ends of element 14. A plurality of slotted or square holes in ramp edges 62 and 64 are located towards the proximal end of ramp panel element 14 for purposes of assembly and adjustment as will be more particularly described hereinafter. A non-skid mat or coating 40 is applied to the obverse side of element 14.

Ramp panel element 16, in the embodiment chosen for illustration, is similar to ramp panel element 14. Element 16 includes obverse side 54, and upturned panel edges 56 and 58. Outer low friction skid plate 42 is mounted to the reverse side of element 16 adjacent the distal end thereof. Medial low friction skid plate 44 is mounted on the reverse side of element 16 intermediate the distal and proximal ends thereof. Carriage bolts, of which 100 is typical, in cooperation with nuts, of which 102 is typical, are illustrative of one way of fastening the various low friction plastic pads in place. Such fastening may also be accomplished by, for example, the use of adhesives, or the like. A non-slip surface is provided by cover or coating 34. Slots 90 are typical of the bolt holes that are provided in the ramp panel elements 14 and 16 for receiving carriage bolts, of which 88 is typical. Other fastening expedients may be employed, if desired.

The ramp panel element is made in two pieces so that the elongated ramp assembly is capable of being broken down into reasonably short lengths for purposes of handling and storage. Also, it allows a combined structural strengthening and joining member to be associated with the ramp elements near the middle of the elongated ramp assembly. The characteristics of this structural strengthening member may be tailored to provide the desired location and amount of deflection of the ramp assembly. In the embodiment chosen for purposes of illustration, ramp tray member 18 serves as both a joining member and a structural strengthening member.

The respective proximal ends of ramp panel elements 14 and 16 are brought into approximate abutting relationship at approximately the mid-point of the elongated ramp assembly. The respective ramp panel members generally extend along approximately a common longitudinal axis so that the trough formed by the two panels is approximately straight.

The proximal ends of ramp panel elements 14 and 16 are held in approximately abutting relationship by being fastened to ramp tray member 18. Adjusting, for example, the length and thickness of member 18 provides control of the structural strength and flexibility of the elongated ramp assembly. The obverse side of main panel 66 of tray 18 mates with the reverse sides of the panel elements 14 and 16 near their proximal ends, and is held there in assembled configuration by nuts and bolts of which bolts 88 and nuts 94 are typical. The upturned edges 68 and 70 of tray member 18 are adapted to mate with ramp edges 62-56 and 64-58, respectively, and to be held in assembled association therewith by fasteners such as, for example, bolts 88. Holes 90 and 92 are brought into registry and fasteners 88 are passed through holes 90 and 92 and held there in assembled configuration by nuts 94. Tray member 18 is preferably mounted so that it extends approximately the same distance from the mid-point toward the distal ends of the respective panel elements 14 and 16.

Figure 8A:
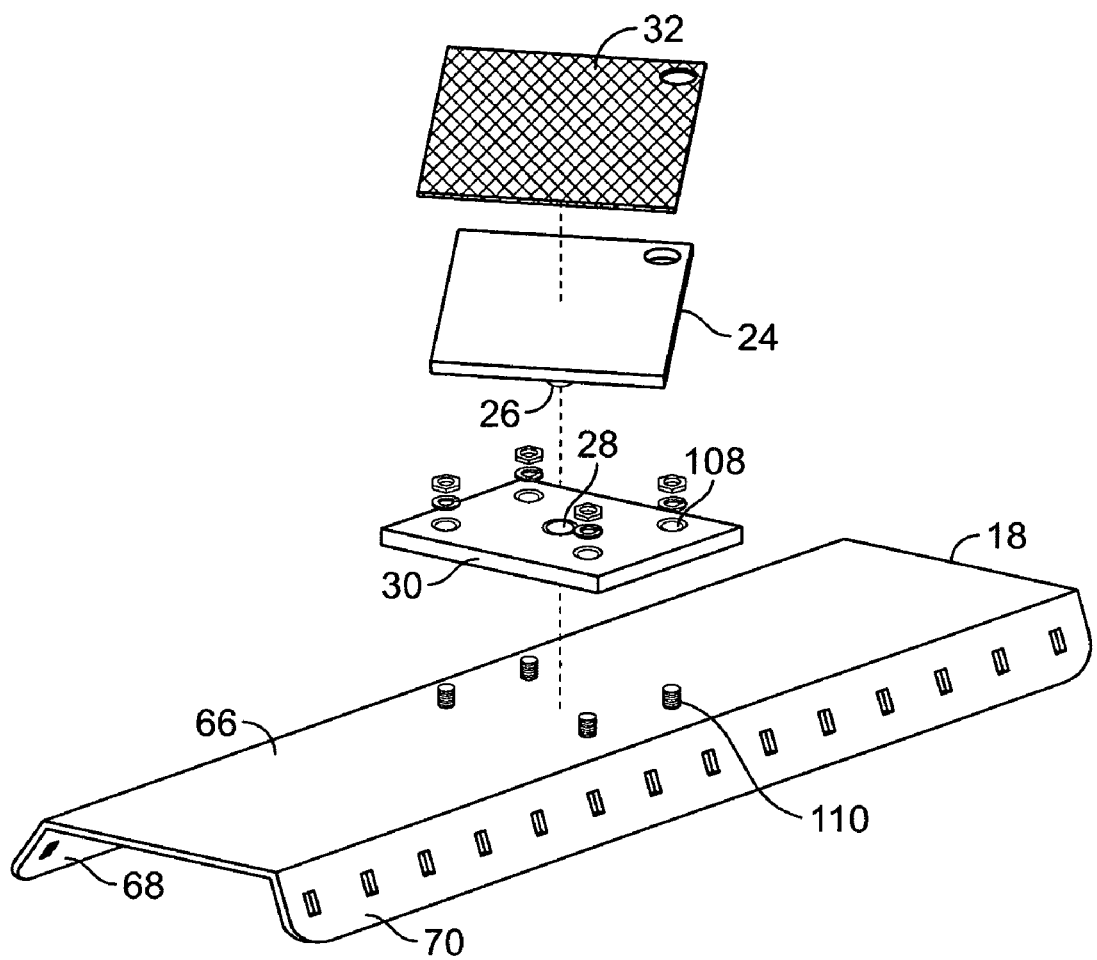
FIG. 8A is an exploded perspective view of a ramp panel tray and swivel plate assembly of the embodiment of FIG. 1.
Figure 8B:
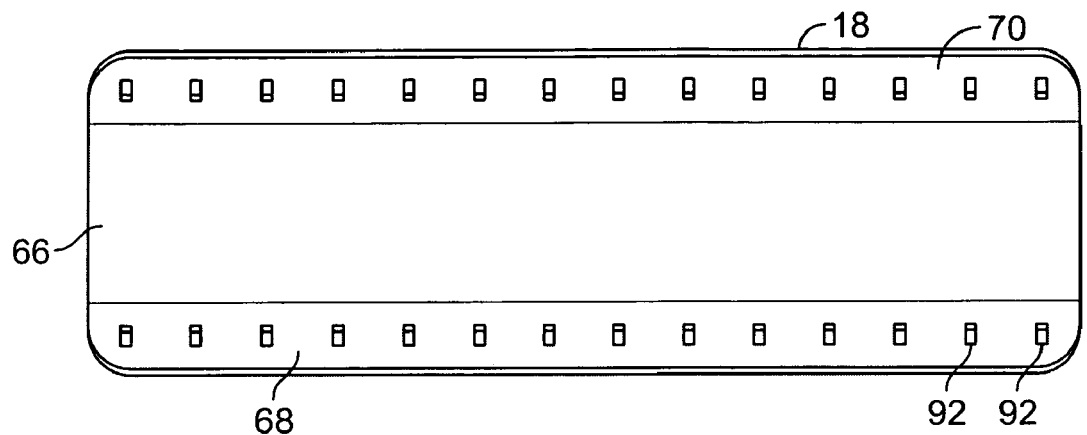
FIG. 8B is a top plan view of the ramp panel tray of the embodiment of FIG. 8A.
Figure 8C:
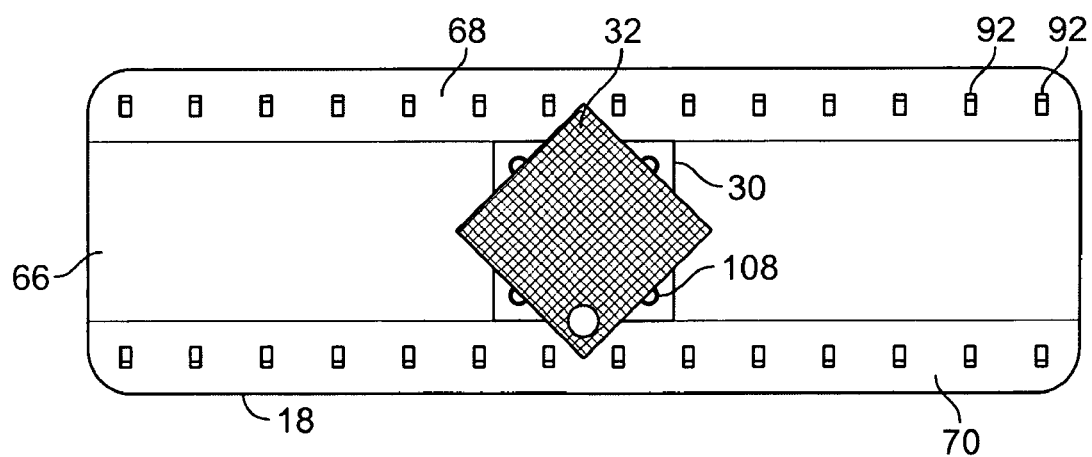
FIG. 8C is a bottom plan view of the ramp panel and swivel plate assembly of the embodiment of FIG. 8A.

Ramp tray member 18 also serves to mount a pedestal-bearing assembly. See particularly, FIGS. 1, 8A and 8C. A pedestal plate 24 is provided with a non-skid surface element 32 on its normally downward face. Element 32 serves to prevent pedestal plate 24 from rotating about the longitudinal axis of stub shaft 26 or skidding laterally across a supporting substrate 112. Swivel plate 30 is non-rotatably fastened to and rotates with the reverse side of ramp tray member 18, for example, by means of threaded stubs 110, or the like. Preferably, at least one of pedestal plate 24 or swivel plate 30 is composed of plastic low friction material similar to that from which skid plates 42, 44, 46 and 48 are constructed. The use of such low friction material for at least one of these plates makes it unnecessary to provide a grease or other separate lubricating material between these two plates.

In the embodiment chosen for purposes of illustration, a sleeve bearing element 28 is provided in swivel plate 30 and a mating stub shaft is mounted to pedestal plate 24. Sleeve bearing element 28 may take the form of a sleeve embedded within swivel plate 30, or just a through hole formed in swivel plate 30. For purposes of repair and replacement, it is preferred to employ a separate sleeve. Also, it may be advantageous to use a different material from the swivel plate for the sleeve.

In some embodiments it may be desirable to employ a bearing assembly that can not be accessed by just pulling plates 24 and 30 apart. In such an assembly the pedestal-bearing assembly comprises a single unit, and a through hole is provided in the plate 24 and cover 32 so that the nuts on studs 110 may be accessed for installation and removal.

Preferably, it is not necessary to employ a thrust bearing in this pedestal-bearing assembly since most of the load is carried by the engagement between the mating faces of the plates 24 and 30. The area of the engaged mating faces should be large enough to carry the anticipated load indefinitely without suffering a degree of wear that would impair its functioning. Since some large fully equipped motorcycles weigh as much as 1,200 pounds, there should be enough engaged area (measured, for example, in square inches) between the plates to rotatably support at least 1,200 pounds through at least 1,000 cycles of rotation through 180 degrees without undue wear. The required area of support is a function of the plastic material that is employed, the characteristics of which are generally know to and available from the suppliers of such plastic low friction materials. In one preferred embodiment, a polyethylene swivel plate having an engaged wear surface of approximately 50 square inches has been found to be satisfactory.

Where repair and replacement are not a concern, swivel plate 30 may be permanently attached to the reverse side of ramp tray member 18, by adhesives, welding, other methods of bonding, or the like. Where the swivel plate 30 is mounted to ramp tray member 18 by threaded studs, the nuts must be recessed enough in the swivel plate so that they do not stick down and interfere with the rotation of plate 30 relative to plate 24. To this end, the holes 108 in swivel plate 30 are preferably counter bored. See, for example, FIG. 8A.

Platform elements 20 and 22 are similar or identical in construction to one another, and function in the same way. Platform elements 20 and 22 form the main structural elements of respective kick stand platform assemblies.

In the embodiment chosen for illustration, the platform element 20 includes an obverse face 80, opposed side rails 82 and 84, and a mounting flange 86 at the proximal end thereof. Slots, of which 96 is typical, are located in the mounting flange 86 for the purpose of receiving bolts 88. A non-skid coating or covering 38 is applied to the obverse face 80 for at least the purpose of preventing a motorcycle kick stand from slipping on obverse face 80 when in the position illustrated, for example, in FIG. 2. Low friction plastic skid plates in the form of stand low friction skid plates 50 and 52 are replaceably mounted to the reverse side of platform element 20, for example, by way of carriage bolts of which 104 is typical, secured by nuts, of which 106 is typical, mounted in counter bored holes in low friction skid plates 50 and 52. The skid plates 50 and 52 serve at least the functions of positioning the platform element at the desired level, stabilizing the elongated ramp assembly, and facilitating the rotational sliding of the turntable.

In the embodiment chosen for illustration, the platform element 22 includes a coating or covering 36 mounted to the obverse face 72 of element 22, opposed side rails 74 and 76, which define the edges of the assembly, and mounting flange 78 in which slots 98 are provided. Low friction plastic skid plates 54 and 56 are adapted to being mounted to the reverse face of platform element 22 by bolts and threadably cooperating nuts mounted in counter bored holes in plates 54 and 56. The platform elements 20 and 22 are typically positioned so that the associated skid pads clear the supporting substrate by a small amount (for example, approximately an eight of an inch) when the turntable is not loaded. As the motorcycle is rolled onto the turntable, the platform assemblies 20 and 22 serve to stabilize the turntable. When a motorcycle is leaned over on its kick stand, the platform assembly on the opposite side of the ramp assembly is typically lifted slightly clear of the supporting substrate, and at least the outer skid plate on the platform assembly that is supporting the kick stand is resting on the floor.

Figure 2:
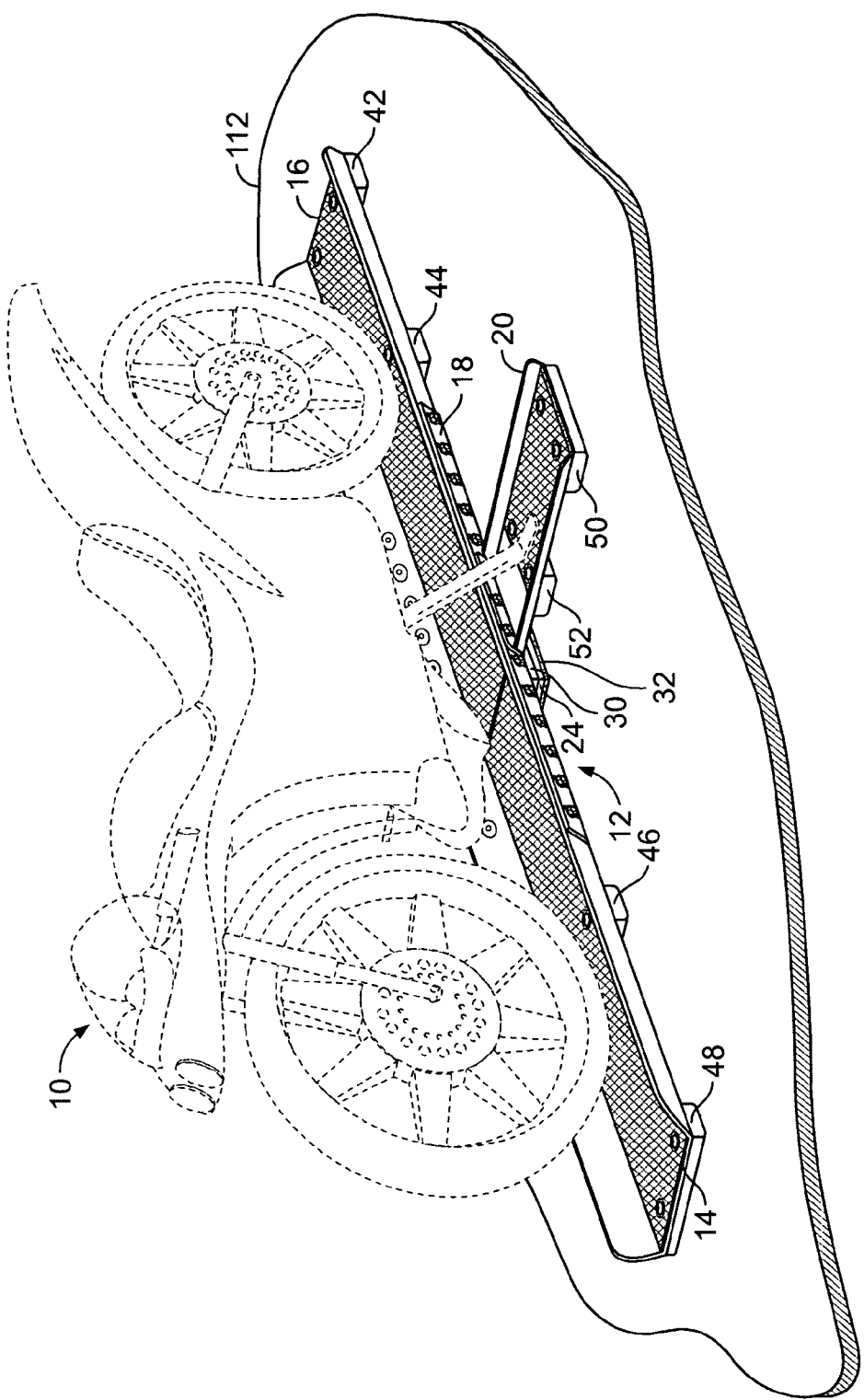
FIG. 2 is a perspective view of the embodiment of FIG. 1 with a motorcycle mounted thereon.
Figure 3:
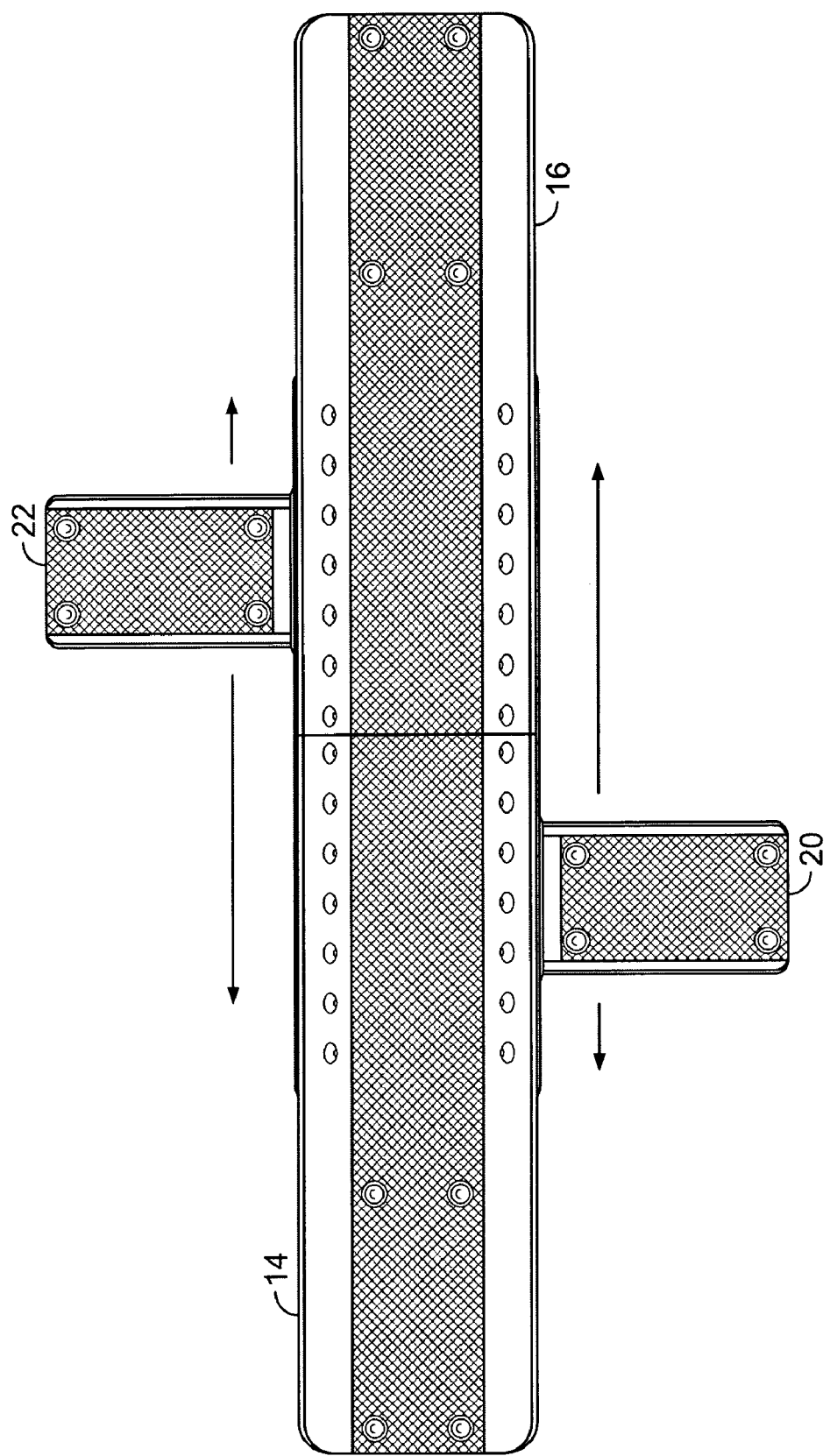
FIG. 3 is a top plan view of the embodiment of FIG. 1.
Figure 6A:
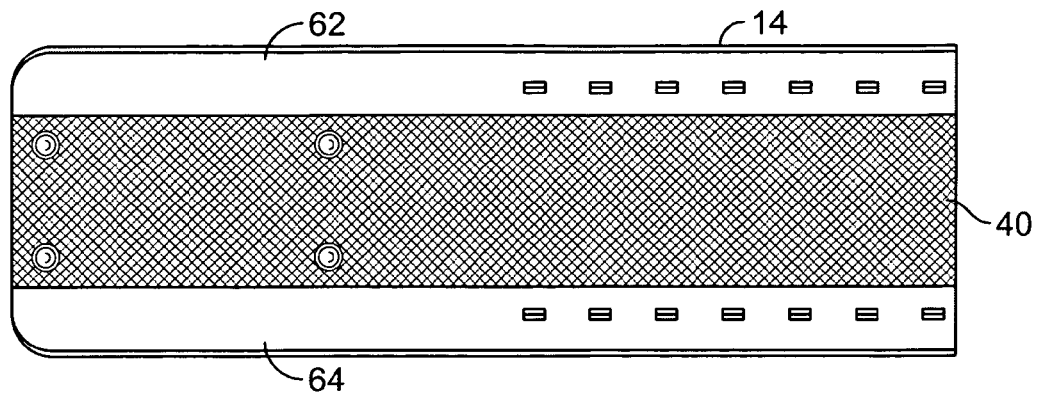
FIG. 6A is a top plan view of a ramp panel of the embodiment of FIG. 1.
Figure 6B:
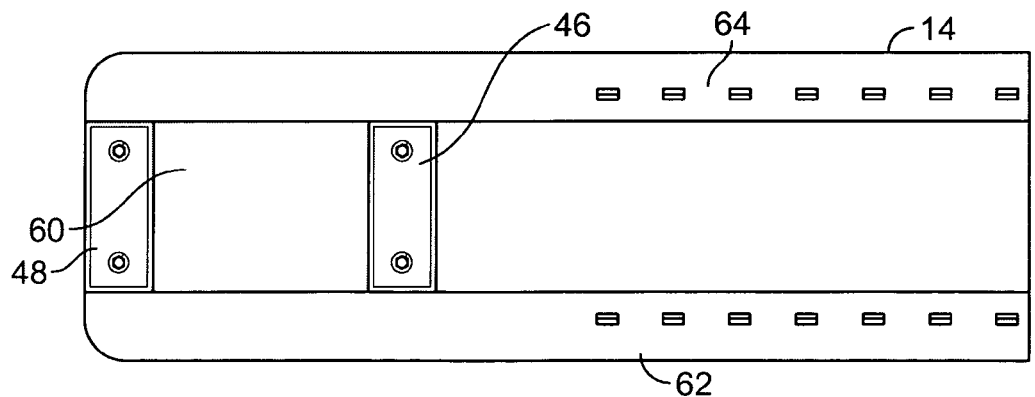
FIG. 6B is a bottom plan view of the ramp panel of the embodiment of FIG. 6A.
Figure 7A:
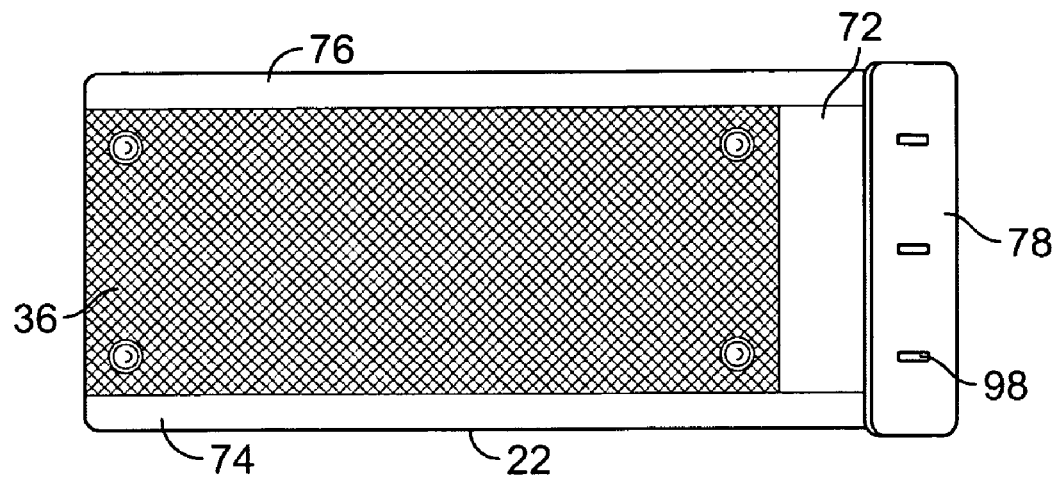
FIG. 7A is a top plan view of a kick stand platform of the embodiment of FIG. 1.
Figure 7B:
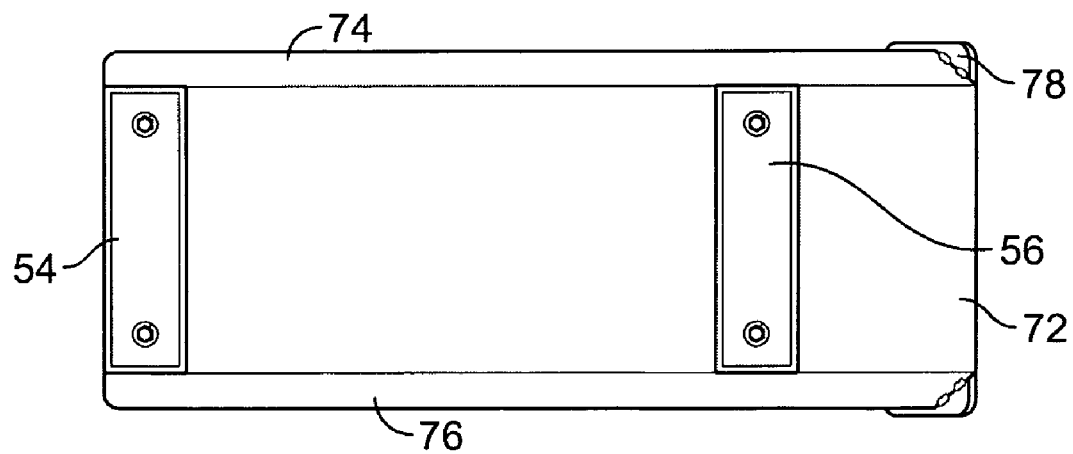
FIG. 7B is a bottom plan view of the kick stand platform of the embodiment of FIG. 7A.
Figure 9:
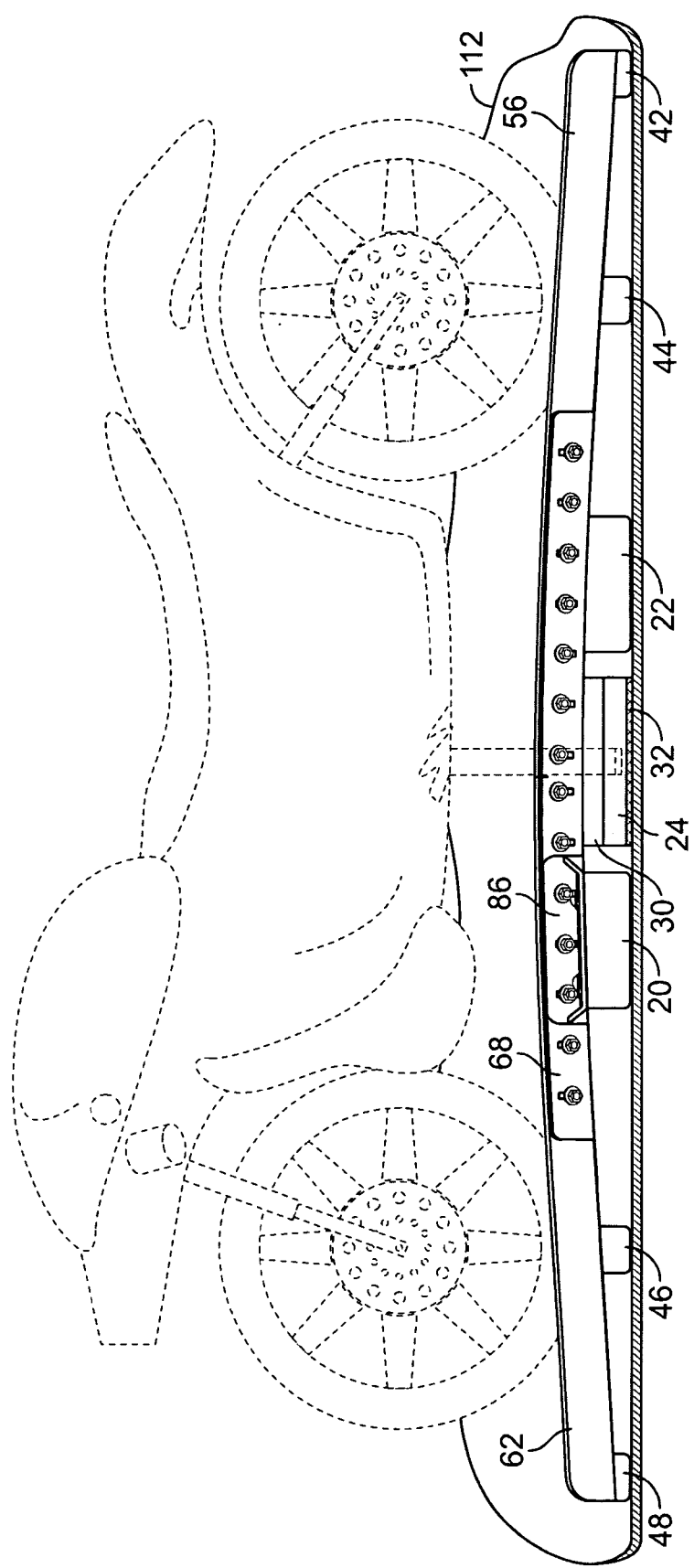
FIG. 9 is a view similar to FIG. 5 illustrating the flexure of the ramp assembly when loaded.

With particular reference to FIG. 9, a motorcycle (shown in phantom) is in position with the kick stand partially extended. When fully extended, the kick stand will fit on one of the kick stand platform elements 20 or 22 as shown in FIG. 2. The weight of the motorcycle causes the elongated ramp assembly to flex and bow downwardly to bring the low friction skid plates 42, 44, 46 and 48 into contact with the supporting floor or other substrate 112. The skid plates all contact the substrate even though they are of different thicknesses. This is because the ramp assembly bows under the weight of the motorcycle. The ramp can be constructed of light enough materials to accommodate this bowing for motorcycles of average weight, for example, 500 pounds and up. This reduces the weight and cost of the ramp assembly. Distributing the weight over several skid plates in this way facilitates the sliding of the ramp assembly as it is rotated, which is a further advantage.

The non-skid coatings or coverings 32, 34, 36, 38, and 40, may be applied as liquids or gels (typically loaded with abrasives) and formed in situ on the obverse faces of the respective supporting structures. Alternatively, preformed coverings that are adhered or fastened in some way to the obverse faces of their respective supporting structures may be used.

Typical materials of construction for one preferred embodiment include, for example, sheet steel (for example, 11 gauge) for the ramp elements 14 and 16, ramp tray member 18, and platform elements 20 and 22. It will be appreciated that other materials of construction including, for example, wood, plastic, composites, or the like, may be employed, if desired. Any material or combination of materials, compatible with the functions and operation of the turntable is contemplated as being within the scope of the present invention.

Typical dimensions for one preferred embodiment include, for example, ramp elements each approximately 46 inches in length and 10 inches in width, ramp tray members approximately 36 inches in length and 10 inches wide, and swivel plates and matching pedestal plates approximately 7 inches square and three quarters of an inch thick. Kick stand platform elements are approximately 24 inches long, 9 inches wide with a mounting flange about 3 inches wide. The plastic skid plates are of various thicknesses. The skid plates in the kick stand platform assemblies may all be, for example, approximately one inch thick. The outer plastic skid plates 42 and 48 may be, for example approximately one half inch thick. The medial plastic skid plates 44 and 46 may, for example, be in the order of approximately three quarters of an inch thick. The pedestal-bearing assembly, including the non-slip element 32, the pedestal plate 24, and the swivel plate 30 may, for example, have a thickness of approximately one and three eighths inch. It will be appreciated that other dimensions and tolerances may be employed, if desired, and proportions and scale may be adjusted to accommodate a particular purpose. Any dimensions, tolerances, proportions, or scale, compatible with the functions and operation of the turntable are contemplated as being within the scope of the present invention.

Carriage bolts are preferably used where ever possible so as to facilitate assembly and disassembly. The elements of the ramp assembly are generally provided with square or slotted holes so as to accommodate the carriage bolts. Slotted holes are used where some adjustment of the elements joined by the carriage bolts may be required. Such adjustment may be needed to accommodate, for example, the vertical placement of the kick stand platforms, or to accommodate wide manufacturing tolerances that permit the use of inexpensive methods of production. See, for example, typical slotted holes 90, 92, 96 and 98. It will be appreciated that other fastening elements and systems, including, for example, rivets, welding bonding, adhesives, or the like, may be employed, if desired. Any fastening system or systems, compatible with the functions and operation of the turntable are contemplated as being within the scope of the present invention.

What have been described are preferred embodiments in which modifications and changes may be made without departing from the spirit and scope of the accompanying claims. Many modifications and variations of the present invention are possible in light of the above teachings. It is therefore to be understood that, within the scope of the appended claims, the invention may be practiced otherwise than as specifically described.

What is claimed is:

1. A motorcycle turntable comprising:
   an elongated ramp assembly having an approximate mid-point, opposed outer ends, an obverse side, a reverse side, and an outer low friction skid plate attached to said reverse side generally adjacent each of said opposed outer ends, said elongated ramp assembly being adapted to supporting a motorcycle thereon; and
   a pedestal-bearing assembly adapted to being pivotally engaged with said elongated ramp assembly at said approximate mid-point, said pivot pedestal-bearing assembly being adapted to supporting said approximate mid-point at a mid-distance from a substrate, said outer low friction skid plates being thinner than said mid-distance, at least two medial low friction skid plates mounted respectively to said reverse side generally intermediate said approximate mid-point and each of said outer low friction skid plates, said medial low friction skid plates being thicker than said outer low friction skid plates and thinner than said mid-distance, and said elongated ramp assembly being adapted to flex sufficiently under the weight of said motorcycle to permit said respective low friction skid plates to contact said substrate, said motorcycle weighing at least 500 pounds.

2. A motorcycle turntable of claim 1 wherein said elongated ramp assembly includes at least two ramp panel elements.

3. A motorcycle turntable of claim 1 wherein said elongated ramp assembly includes at least two ramp panel elements releasably received reverse side down in an upwardly opening ramp tray member located between said medial low friction skid plates.

4. A motorcycle turntable comprising:
   a ramp assembly including a pair of elongated ramp panel elements and a ramp tray member, each of said elongated ramp panel elements having a proximal end, a distal end, an obverse side, and a reverse side, said elongated ramp panel elements adapted to being detachably mounted to said ramp tray member with their respective distal ends projecting generally outwardly of said ramp tray member and their respective reverse sides received in said ramp tray member, each of said elongated ramp panel elements having at least an outer low friction skid plate attached to the reverse side thereof generally adjacent said distal end; and
   a pedestal-bearing assembly adapted to being pivotally engaged with said ramp assembly at an approximate mid-point of said ramp tray member, said pedestal-bearing assembly being adapted to supporting said ramp assembly at a first distance from a substrate, said outer low friction skid plates being adapted to supporting said respective distal ends a second distance from said substrate, said second distance being less than said first distance, said ramp assembly being adapted to flex sufficiently under the weight of a motorcycle to permit each of said outer low friction skid plates to contact said substrate, said motorcycle weighing at least 500 pounds.

5. A motorcycle turntable of claim 4 including at least one kick stand platform assembly adapted to being adjustably mounted along an edge of said ramp assembly projecting approximately parallel to and spaced from said substrate by a stand distance.

6. A motorcycle turntable of claim 5 wherein said kick stand platform assembly includes at least one stand low friction skid plate mounted to a normally lower side thereof, said stand low friction skid plate being less in thickness than said stand distance.

7. A motorcycle turntable of claim 5 including a second kick stand platform assembly, said respective kick stand platform assemblies being adapted to being mounted on opposed edges of said ramp assembly.

8. A motorcycle turntable wherein an elongated ramp is pivotally supported on a pedestal-bearing assembly for slidable rotation about said approximate mid-point, said motorcycle turntable comprising:
   said elongated ramp assembly including said approximate mid-point, opposed outer ends, an obverse side, a reverse side, and outer low friction skid plates attached to said reverse side generally adjacent each of said opposed outer ends;
   said pedestal-bearing assembly adapted to being mounted and pivotally engaged with said ramp assembly at said approximate mid-point, said pedestal-bearing assembly being adapted to rotatably supporting said approximate mid-point at a mid-distance from a substrate, said outer low friction skid plates being thinner than said mid-distance, said elongated ramp assembly being adapted to sliding on said outer low friction skid plates as said slidable rotation is accomplished, said ramp assembly being adapted to flex sufficiently under the weight of a motorcycle to permit each of said outer low friction skid plates to contact said substrate, said motorcycle weighing at least 500 pounds; and
   at least two medial low friction skid plates, said medial low friction skid plates being mounted to said reverse side on each side of said approximate mid-point generally intermediate said approximate mid-point and each of said outer low friction skid plates, said medial low friction skid plates being thicker than said outer low friction skid plates and thinner than said mid-distance.

\* \* \* \* \*